3,704,201
METHOD OF MAKING LIGNIN CONTAINING GROUNDWOOD BY HYDROLYSIS AND ALKALI TREATMENT OF WOOD CHIPS
Olavi Erland Helasti, Pyhan Laurintie, Helsinki, Finland
No Drawing. Filed Mar. 11, 1970, Ser. No. 18,718
Int. Cl. D21c 3/26
U.S. Cl. 162—19
2 Claims

ABSTRACT OF THE DISCLOSURE

A method for making groundwood from wood chips. The wood chips are subjected to hydrolysis which removes most of hemicellulose from the wood but leaves intact most of the lignin. The resulting product is neutralized and treated with alkali and then refined and washed.

---

The present invention concerns a method for manufacturing from wood such pulp which is especially intended for use in manufacturing pressed products and in which method chipped wood, coarsely ground wood, sawdust or equivalent is subjected to hydrolysis or to some other chemical process. It is well-known that the principal components of wood are cellulose, lignin and hemicellulose, which are present in different proportion in different wood species. For instance, Finnish floated birch timber contains 40% cellulose, 20% lignin and 40% hemicellulose. In finished sulphate birch cellulose there may be 65% cellulose, 3.5% lignin and 30% hemicellulose, and 0.5% extractive substances. It is thus seen that most of the lignin has been removed and also part of the hemicellulose.

This is in fact natural because cellulose is mainly used for manufacturing paper, in that lignin is mostly an undesirable substance from the viewpoint of paper manufacturing.

Fibre containing lignin is stiff and it presents poor binding capacity, poor swelling capacity and also poor beatability. In contrast, hemicellulose is a favourable substance in regard of paper manufacturing. It promotes the beatability, takes up water readily and swells, it forms a glue-like substance on the surfaces of the fibre and paper or pulp sheet and increases the external surface area, flexibility and binding capacity. Accordingly, the trend has been to remove from the wood the lignin and to leave an appropriate amount of hemicellulose in the pulp. Owing to these reasons, the hydrolysis residue has not found any uses other than burning or further digestion with lignin-removing chemicals.

However, there are types of paper and cardboard which are not required to possess the characteristics common in paper technology. These include paper and cardboard brands impregnated with various chemicals, and pressed products. To the same category belong also porous and absorbent fibre products intended to be discarded after use. In addition to the above-mentioned porosity and absorbing capacity, pressed products are required to present thermoplastic properties and dimensional stability. Also in the manufacturing of such products common cellulose has been used although its use for manufacturing products of the said kind is not expedient for the reason that cellulose pulp normally lacks the characteristics which a raw material used for manufacturing said products should have.

Accordingly, the aim of the present invention is to accomplish a method by which, from wood, pulp is obtained which is better appropriate for manufacturing products of the above kind than cellulose pulp. That is, to achieve a pulp which has good absorbency and possesses the characteristic of dimensional stability and which has thermoplastic properties.

Therefore, a method according to the invention is mainly characterized in that wood chips, coarsely ground wood or sawdust is subjected to such hydrolysis or other chemical reaction which removes from the wood the major part of the hemicellulose but leaves at least an appreciable part of the lignin, and that the wood residue thus obtained is then ground into fibres in some manner belonging to prior art and purified from its content of acids, waste products and extracted substance produced in the reaction, by using water, heat, alkalis, softening agents, organic solvents or bleaching. Since in a method according to the invention the hemicellulose is removed from the wood, the swelling of the pulp is eliminated. The fact, again, that the lignin remains in the pulp causes the pulp to have good absorbency, dimensional stability and a thermoplastic property. In other words, a pulp is obtained which is highly appropriate for the manufacturing of certain paper and cardboard types, of pressed products and of discardable, absorbent fibre products.

As has been said above, the wood chips or equivalent are at first subjected to a treatment in which the greater part of the hemicellulose is removed. This is accomplished by means of hydrolysis or by other previously known chemical reactions, which in themselves belong to the known art of cellulose manufacturing. In the present instance merely the course of hydrolysis is governed to be such that no worthwhile amounts of lignin are removed from the wood chips. Upon hydrolysis, the coarsely divided wood material is ground into fibres. In this operation, too, previously known methods come into question, such as the mechanical method or blowing the pulp from the pressurized reactor into unpressurized space. These methods may be applied in combination or separately. From the pulp thus obtained the waste substances produced in the reaction, the acids and residual extractive substances are removed with the aid of alkalis, heat, water, softening agents, organic solvents or bleaching. Depending on the temperature and reaction time employed in the reaction phase, the efficiency of washing, washing agents and methods may be modified and combined. The temperature must not rise higher than 100° C. at this stage in order that the lignin might remain virtually unchanged. It should be noted that in alkali treatment lignin becomes less water-absorbing and, consequently, the final product will present greater dimensional stability. If required, the pulp may be bleached by applying such previously known methods which conserve the lignin. Finally, the pulp is acidified in order to give it an appropriate pH value.

Handling of the pulp produced in the manner described, such as sorting, forming, drying and potential dry defibration, and manufacturing of the paper, is accomplished according to methods of prior art.

The following is an example describing pulp which was obtained from birch wood chips hydrolyzed with about 8 kp./cm.$^2$ (gauge) steam and which was heat-treated and alkali-treated. Duration of treatment was about 1 hour.

| Treatment temperature, °C. | Breaking strength at beating degree 30 SR°, m. | Percentage in the pulp of dissolved hydrolysis residues | NaOH used in percent of pulp | Absorbency at beating degree 20 SR,° mm. | pH |
|---|---|---|---|---|---|
| 2 | 1,200 | | | 60 | 4.0 |
| 20 | 1,600 | 9 | 1.5 | 58 | 7.0 |
| 50 | 3,000 | 10 | 2.0 | 55 | 7.0 |
| 75 | 3,800 | 10.5 | 2.2 | 55 | 7.0 |

After this, the lignin content was about 25%, that is nearly all of the lignin in birch wood remained intact. The pentosan content was about 5%.

It is evident from the study mentioned above that with increasing temperature, increasing consumption of chemicals and corresponding reduction of impurities the properties of the pulp relating to paper technology, in particular its strength, increase very strongly.

Since in the course of this change the fibre material becomes softer, the pulp sheet naturally settles to greater compactness. This is apparent as a slight decrease in absorbency. However, the absorbency still remains good enough.

When e.g. acetone-methanol mixture is used instead of NaOH, the impurities are dissolved with somewhat higher efficiency compared to the above example.

Two tables (Tables 1 and 2) are presented below in which products made of pulp manufactured according to the invention have been compared to products made from other kinds of pulp.

additive substances, and opacity and thickness required by its intended use and which is suitable for manufacturing sheet-like pressed goods, comprising the following steps:

(1) removing hemicellulose from wood chips or wood residue containing hemicellulose by subjecting the wood chips in the water or steam phase to hydrolysis at 120–200° C. whereby the hemicellulose is decomposed, but the lignin remains unchanged, the type of the decomposition products depending on the reaction time and temperature in the hydrolysis step and on the manner in which the hydrolysis is performed, (2) removing the hemicellulose decomposition products, (3) the product thus obtained is neutralized and treated with alkali in order to facilitate its defibration at a temperature which is so low that the lignin remains unchanged, and (4) defibrating, grinding, sorting and washing the product thus obatined.

TABLE 1.—PROPERTIES OF PAPERS MANUFACTURED FOR LAMINATION PURPOSES

| | Paper manufactured of 100% pulp according to the invention | Paper manufactured of 50% of said pulp plus 50% sulphate cellulose | Equivalent commercially available paper |
|---|---|---|---|
| Density, g./cm.$^3$ | 0.620 | 0.606 | 0.660 |
| Porosity, seconds (Gurley-Hill) | 6.0 | 7.4 | 64.0 |
| Water absorption, mm. (Klemm): | | | |
| Machine direction: | | | |
| 4 min | 29 | 27 | 17 |
| 10 min | 44 | 43 | 27 |
| Cross-machine: | | | |
| 4 min | 25 | 23 | 14 |
| 10 min | 37 | 35 | 21 |
| Glue substance uptake rate, seconds (William, TEA 200c$^P$): | | | |
| Wire side | 8.1 | 19.6 | 52.2 |
| Top side | 5.6 | 12.4 | 18.2 |
| Moisture expansion, percent (33% to 75% RH): | | | |
| Machine direction | 0.12 | 0.12 | 0.21 |
| Cross-machine | 0.38 | 0.39 | 0.53 |

TABLE 2.—DIMENSIONAL STABILITY OF LAMINATED BOARDS MADE OF PHENOL RESIN-IMPREGNATED PAPERS BY PRESSING

| | Paper manufactured of 100% pulp according to the invention | Paper manufactured of 50% of said pulp plus 50% sulphate cellulose | Equivalent commercially available paper |
|---|---|---|---|
| 2-hour boiling test: | | | |
| Weight increase, percent | 6.1 | 7.4 | 9.5 |
| Increase in thickness, percent | 4.8 | 8.1 | 9.7 |
| 24-hour (20° C.) water absorption: | | | |
| Weight increase, percent | 3.5 | 6.0 | 9.2 |
| Increase in thickness | 2.6 | 4.7 | 6.3 |

I claim:

1. Method for making fibrous material for use in forming a pulp web, such as paper or cardboard, having good dimensional stability, uptake capacity for glue and other 2. Method according to claim 1, characterized in that the washing in step (4) is carried out at a temperature lower than 100° C.

(References on following page)

References Cited

UNITED STATES PATENTS

| | | | |
|---|---|---|---|
| 2,999,783 | 9/1961 | Terai et al. | 162—14 |
| 3,640,768 | 2/1972 | Eickemeyer | 162—14 X |
| 3,652,387 | 3/1972 | Wilder | 162—25 |
| 3,055,792 | 9/1962 | Von Koeppen et al. | 162—25 |
| 3,186,899 | 6/1965 | Madison et al. | 162—71 X |
| 2,620,271 | 12/1952 | Ruff et al. | 162—71 X |
| 3,388,037 | 6/1968 | Asplund et al. | 162—28 X |
| 3,380,883 | 4/1968 | Richter et al. | 162—19 |
| 3,383,277 | 5/1968 | Gordon et al. | 162—19 |
| 3,530,034 | 9/1970 | Erickson | 162—19 |

S. LEON BASHORE, Primary Examiner

A. L. CORBIN, Assistant Examiner

U.S. Cl. X.R.

162—25, 71